United States Patent [19]
Yamada et al.

[11] 3,787,334
[45] Jan. 22, 1974

[54] PROCESS FOR PREPARATION OF OXIDATION CATALYST

[75] Inventors: Keisho Yamada; Sumio Umemura; Kyoji Ohdan, all of Ube; Mikio Hidaka, Shimonoseki; Yasuo Bando, Ube; Kazuo Fukuda, Ube; Masao Sawazi, Ube, all of Japan

[73] Assignee: UBE Industries, Ltd., Yamaguchi-ken, Japan

[22] Filed: Nov. 23, 1971

[21] Appl. No.: 201,391

[30] Foreign Application Priority Data
Dec. 1, 1970    Japan............................. 45-105441

[52] U.S. Cl. ............................................... 252/468
[51] Int. Cl.......................... B01j 11/06, B01j 11/32
[58] Field of Search............................ 252/468, 456

[56] References Cited
UNITED STATES PATENTS
3,387,038   6/1968   Koch............................. 252/468 X
3,346,617   10/1967  Hiroki et al..................... 252/468 X
3,641,100   2/1972   Yamada et al.................. 252/456 X Primary Examiner—C. F. Dees
Attorney, Agent, or Firm—Leonard W. Sherman et al.

[57] ABSTRACT

A process for the preparation of an oxidation catalyst, consisting of molybdenum, bismuth, a group II metal of the periodic table and oxygen, which comprises in combination the steps of combining (a) a dispersion in which a member selected from the group consisting of the oxides of antimony and bismuth antimonate has been suspended, (b) a solution of a salt of a group II metal of the periodic table, (c) a solution of a member selected from molybdic acid and the salts thereof, and (d) a solution of a bismuth salt; adjusting the pH of the combined solution to a value of 1 – 8 to thereby cause the formation of a coprecipitate containing the four components of molybdenum, antimony, bismuth and group II metal; separating the resulting coprecipitate from the mother liquor; washing the coprecipitate; and thereafter calcining the washed coprecipitate at a temperature ranging from 400° and 800°C.

7 Claims, No Drawings

PROCESS FOR PREPARATION OF OXIDATION CATALYST

This invention relates to a process for the preparation of improved oxidation catalysts consisting of molybdenum, antimony, bismuth, a metal of group II of the periodic table, and oxygen, which catalysts are especially conveniently used in the preparation of unsaturated aldehydes, unsaturated nitriles, conjugated diolefins and the like from olefins.

More specifically, the invention relates to a process for the preparation of oxidation catalysts consisting of molybdenum, antimony, bismuth, a metal of group II of the periodic table and oxygen, which comprises combining (a) a dispersion consisting of a suspension of either an oxide of antimony or bismuth antimonate, (b) a solution of a salt of a metal of group II of the periodic table, (c) a solution of molybdic acid or a salt thereof, and (d) a solution of a bismuth salt; adjusting the pH of this mixture to a value of 1 – 8 to cause the formation of a coprecipitate containing the foregoing four components of molybdenum, antimony, bismuth and the metal of group II of the periodic table; separating the resulting coprecipitate from the mother liquor; washing the so obtained coprecipitate; and thereafter calcining the washed coprecipitate at a temperature of 400° – 800°C.

In the preparation of unsaturated aldehydes, unsaturated nitriles, conjugated diolefins and the like, numerous proposals have been made in the past regarding the oxidation catalyst to be used therefor, and various methods of preparing the same are known.

Further, a catalyst consisting of the three metallic components of molybdenum, antimony and bismuth and oxygen, or a catalyst consisting of two of these metallic components, or a catalyst consisting of two of these metallic components and another metal as a third component is also known to be valuable as the oxidation catalyst of olefins from such disclosures as Japanese Patent Applications Publications Nos. 10111/1964, 1806/1970, 7290/1970 and 5870/1961, U.S. Pat. Nos. 3,248,310 and 3,354,197, Australian Patent No. 243,315 and French Patent No. 1,247,785.

However, the catalysts prepared by the foregoing known methods, when used for the catalytic oxidation or ammoxidation of propylene give only a low conversion of propylene per unit weight of the catalyst. Accordingly, notwithstanding the fact that acrolein or acrylonitrile can be obtained at a relatively high selectivity, the yield of acrolein or acrylonitrile is low. Therefore, in order to obtain the acrolein or acrylonitrile at a high conversion and high selectivity, either the contact time must be prolonged or the catalyst must be used in a large amount. Consequently, in checking the occurrence of side reactions and preparing the acrolein and acrylonitrile in good yield, these catalysts cannot be regarded as being desirable.

A further shortcoming of the catalysts prepared by the conventional methods was that they might be useful in preparing unsaturated nitriles, for example, but might not be useful for preparing unsaturated aldehydes or conjugated diolefins.

With a view to overcoming these drawbacks and developing a catalyst which, as compared with the catalysts prepared by the conventional methods, could prepare with a small amount of catalyst, i.e. with a short contact time, unsaturated aldehydes, unsaturated nitriles and conjugated diolefins from olefins at an especially high conversion while checking the setting up of side reactions and moreover at a high rate of selectivity and in good yield, it has been discovered that a catalyst prepared in accordance with the hereinafter fully described specific process and containing the four specific metallic components of molybdenum, antimony, bismuth and a metal of group II of the periodic table, and oxygen demonstrates a high rate of conversion and high selectivity with a short contact time, thus making the attainment of the objects of the present invention an easy matter.

Accordingly, the invention provides a process for the preparation of oxidation catalysts consisting of molybdenum, antimony, bismuth, a group II metal and oxygen, which comprises combining (a) a dispersion consisting of a suspension of either an oxide of antimony or bismuth antimonate, (b) a solution of a salt of a group II metal, (c) a solution of molybdic acid or a salt thereof, and (d) a solution of a bismuth salt; adjusting the pH of this mixture to a value of 1 – 8 to cause the formation of a coprecipitate containing the foregoing four components of molybdenum, antimony, bismuth and the group II metal; separating the resulting coprecipitate from the mother liquor; washing the so obtained coprecipitate; and thereafter calcining the washed coprecipitate at a temperature of 400° – 800°C.

The oxide of antimony to be used in the invention includes such as, for example, the commercially available antimonous oxide and antimonic oxide. Needless to say, it also may be a fresh oxide of antimony prepared from such, for example, as antimonous chloride, antimonic chloride, antimonic oxychloride and antimony hydroxide. On the other hand, the bismuth antimonate may be one prepared in customary manner, but one instance of a most convenient method of preparing the bismuth antimonate is as follows:

First, antimonous chloride is dissolved in concentrated hydrochloric acid. Water is added to the solution to effect its hydrolysis and the formation of a precipitate. Aqueous ammonia is then added to form an oxide of antimony. Next, a nitric acid solution of bismuth nitrate is added and the solution is heated at 300° – 400°C. The resulting solid matter is kneaded with water and then dried, following which it is calcined at an elevated temperature of 500° – 1,100°C., thereby obtaining a conveniently usable bismuth antimonate.

In suspending the oxide of antimony or bismuth antimonate, the powder of these substances may be suspended in, for example, mineral acids such as nitric or hydrochloric acid, aqueous ammonia, water, and organic acids such as acetic acid; water being most suitable from the economical standpoint.

The dispersion consisting of a suspension of either the oxide of antimony or bismuth antimonate is best used at a concentration of 1 – 50 % by weight, and preferably 3 – 20 % by weight, calculated as antimonous oxide.

As the solution of molybdic acid or salts thereof, usable are such as, for example, molybdic acid or the soluble molybdates such as ammonium molybdate, sodium molybdate and potassium molybdate in solution in either water, mineral acids such as hydrochloric and nitric acids, organic acids such as acetic acid or aqueous ammonia. Needless to say, metallic molybdenum and molybdenum trioxide ($MoO_3$) can also be dissolved in, for example, nitric acid or aqueous ammonia and used as the solution of molybdic acid or a salt thereof.

These solutions of molybdic acid or salts thereof are best used at a concentration of 5 – 50 % by weight, and preferably 10 – 40 % by weight, calculated as molybdenum trioxide ($MoO_3$).

As the solution of bismuth salts, usable are such as, for example, the soluble inorganic acid salts of bismuth as bismuth nitrate, bismuth chloride, bismuth oxychloride, bismuth sulfate, basic bismuth nitrate [$BiNO_3 \cdot (OH)_2 \cdot BiO(OH)$] and basic bismuth carbonate or the soluble bismuthates such as sodium bismuthate, in solution in either water, mineral acids such as nitric and hydrochloric acid, or organic acids such as acetic acid. Needless to say, also usable as the solution of bismuth salts are metallic bismuth and an oxide of bismuth dissolved in mineral acids such as nitric and hydrochloric acids.

These solutions of bismuth salts are best used at a concentration of 3 – 50 % by weight, and preferably 10 – 40 % by weight, calculated as bismuthous oxide ($Bi_2O_3$).

On the other hand, conveniently usable as the solution of a salt of metal of group II of the periodic table is either a nitrate, chloride, hydroxide or an organic acid salt of a metal such as magnesium, calcium, strontium, barium, zinc, cadmium and mercury, in solution in either water, a mineral acid such as nitric or hydrochloric acid, or an organic acid such as acetic acid. Needless to say, these group II metals and oxides thereof can also be used when dissolved in nitric acid. Metals which are particularly desirable in the present invention, in the order of their importance, are calcium, barium, magnesium and zinc.

The solution of a group II metal salt are best used at a concentration of 1 – 60 % by weight, and preferably 3 – 40 % by weight, calculated as the oxides of the group II metal.

These starting compounds, i.e., an oxide of antimony, bismuth antimonate, a group II metal salt, molybdic acid or its salt, and a bismuth salt, are usually best combined and mixed such that the atomic ratio in percent of the four metallic compounds is as indicated below, though differing somewhat depending on the use to which the intended catalyst is to be put.

Mo: 5 – 60 %, preferably 10 – 40 %
Sb: 5 – 60 %, preferably 10 – 40 %
Bi: 5 – 60 %, preferably 10 – 40 %
Group II metal: 5 – 60 %, preferably 10 – 40 %

In the present invention, for to obtain a catalyst whose production yield is high and which demonstrates a high selectivity during the oxidation reaction, it is preferred that the atomic ratio in percent of antimony and that of bismuth are substantially equal. The atomic ratio of molybdenum to the group II metal can be varied widely within the limits of 1 : 5 to 5 : 1, and especially preferably from 1 : 3 to 3 : 1.

It is essential that the catalyst in accordance with the present invention contains a metallic component of group II of the periodic table. That is, the invention catalyst excels the corresponding catalysts not containing the group II metallic component in that it has the property of yielding by means of the oxidation of ammoxidation of olefins the intended product at a higher conversion and moreover at a high selectivity. The invention catalyst also has the economic advantage that it can be prepared at a lower cost than the case of the corresponding catalysts not containing the group II metallic component.

According to the invention, no particular restrictions are imposed as to the sequence in which (a) the dispersion of the oxide of antimony or bismuth antimonate, (b) the solution of a group II metal salt, (c) the solution of molybdic acid or a salt thereof, and (d) the solution of a bismuth salt are mixed. For example, the solution of a group II metal salt, the solution of molybdic acid or its salt and the solution of a bismuth salt can be added to the dispersion consisting of a suspension of an oxide of antimony or bismuth antimonate. Althernately, the oxide of antimony or bismuth antimonate can be dispersed and suspended in one or two of the solutions selected from the group consisting of the solution of a group II metal salt, the solution of molybdic acid or its salt and the solution of a bismuth salt, after which the remaining solution or solutions can be added to the suspension.

According to the invention, the mixture containing the aforesaid four metallic components is stirred while maintaining the pH of the mixture at 1 – 8, and preferably 2 – 7, thereby forming a coprecipitate consisting of antimony, molybdenum, bismuth, the group II metal and oxygen. While no particular restrictive conditions are imposed in this case other than that the pH is maintained within the foregoing limits, the stirring is preferably carried out for about 10 minutes to 3 hours at a temperature of usually 10° – 90°C.

It is not fully clarified as yet as to what reactions are set up in the combined solution during the formation of this coprecipitate or as to what compounds make up the coprecipitate. However, as a result of analyses by means of X-ray diffraction and infrared absorption spectrum, it is assumed that the catalyst of the present invention consists predominantly of bismuth antimonate and a molybdate of the group II metal. The catalyst disclosed in, for example, Australian Patent No. 243,315 and consisting of $Sb_2O_3$ — $MoO_3$ and $Bi_2O_3$ — $MoO_3$ was not observed at all.

Further, from the fact that only a low conversion is demonstrated in the ammoxidation of propylene in the cases of the catalysts consisting of either $Sb_2O_3$ — $MoO_3$ or $Bi_2O_3$ — $MoO_3$ singly or a mere mixture of the several oxides of molybdenum, antimony, a group II metal and bismuth, it is presumed that an interaction of some sort or other between the group II metal molybdate and the bismuth antimonate has been created in this invention.

According to the invention, the so formed coprecipitate is then separated from the mother liquor by means of a known solid-liquid separation operation, e.g., an operation such as filtration or centrifugation, followed by thorough washing of the separated coprecipitate in water. In performing this washing a dilute aqueous solution of either nitric acid or ammonia can be used, if necessary.

An important feature of this invention resides in forming a coprecipitate consisting of the four specific metallic components of molybdenum, antimony, bismuth and a group II metal, and oxygen, separating this coprecipitate from the mother liquor and thoroughly washing the coprecipitate. The preparation of a catalyst having a large surface area and in which the four metallic components are dispersed uniformly is made possible by this operation.

Thus, by the adoption of the process for the preparation of the catalyst of this invention, it becomes possible in the case, for example, of preparing acrylonitrile by the ammoxidation of propylene to obtain a conversion of the propylene of above 80 % and moreover at a high selectivity for acrylonitrile of above 80 %. Further, a catalyst excelling in catalytic activity and reaction selectivity can be obtained, which not only is usable in the case of the preparation of unsaturated nitriles but can also be very conveniently used for the preparation of unsaturated aldehydes and conjugated diolefins from olefins.

It is usually difficult to prepare a catalyst which excels in both conversion and selectivity by methods or preparation other than that of the present invention.

In the usual methods of preparing oxidation catalysts heretofore, the method of reacting the several catalyst components in the solid phase was usually employed, but a catalyst obtained by this method has only a small surface area and, in addition, it is exceedingly difficult to obtain, for example, acrylonitrile from propylene at a high conversion and moreover at a high selectivity.

It was truly surprising that an oxidation catalyst excelling both in its conversion and selectivity could be prepared as in this invention by a method of reacting in the aqueous phase the several components of a catalyst consisting of four specific metallic components, washing the resulting coprecipitate thoroughly and calcining the so obtained coprecipitate.

In this invention, it is sufficient that soluble ions that are readily volatilized and removed by the heat treatment conducted at ordinary calcination temperatures, such as $NH_4^+$, $CO_3^=$ and $NO_3^-$, may be washed away until the content in the coprecipitate is less than about 5 % by weight. However, it is important that ions that cannot be readily removed by the heat treatment conducted at ordinary calcination temperatures, such as alkali metal ions, e.g., $Na^+$ and $K^+$, and ions that may be bonded to the metallic components of the catalyst to modify the catalyst, such as $SO_4^=$ and $Cl^-$, and ions of the unreacted metal of group II remaining in excess must be removed by washing as much as possible, for instance, until the content in the coprecipitate becomes less than about 0.1 % by weight.

Further, the thoroughly washed coprecipitate is best calcined at a temperature of 400° – 800°C., and preferably 500° – 700°C. A calcination time of usually 3 – 20 hours is preferred in this case.

Again, in the process for the preparation of the catalyst of the present invention, a method also can be employed wherein a carrier material is suspended along with the suspension of the oxide of antimony or bismuth antimonate, following which the solution of a group II metal salt, the solution of molybdic acid or its salt and the solution of a bismuth salt are added. When this method is employed, not only can a catalyst excelling in its activity as well as selectivity be obtained but also a catalyst in which the active components have been deposited uniformly on a carrier can be obtained in a single operation.

As the carrier material, mention can be made of such, for example, as silica, alumina, alumina-silica, silicates, kaolin and diatomaceous earth.

One mode of preparing the catalyst according to the invention will be described below.

Antimonous oxide or bismuth antimonate in a prescribed amount is suspended in water, or either of these compounds is suspended in water along with a carrier material. To the so obtained suspension an aqueous solution of a nitrate of a group II metal is added, and thereafter an aqueous ammonia solution of ammonium molybdate and an aqueous nitric acid solution of bismuth nitrate are concurrently added dropwise with thorough stirring. The pH of this combined solution is then adjusted to 3 – 6 with ammonia water. After allowing the solution to stand for about 30 minutes with stirring, decantation is carried out with water and the resulting coprecipitate is separated, after which it is thoroughly washed in water. The washed coprecipitate is dried for 16 hours at about 120° – 130°C. and thereafter comminuted and sieved. As a result, the intended catalyst having a high activity as well as high selectivity is obtained.

The catalyst prepared according to the invention process, which consists of molybdenum, antimony, bismuth, a group II metal, and oxygen, is best prepared so as to contain the four metallic components in an atomic ratio in percent as follows:

Molybdenum: 5 – 60 %, preferably 10 – 40 %
Antimony 5 – 60 %, preferably 10 – 40 %
Bismuth: 5 – 60 %, preferably 10 – 40 %
Group II metal: 5 – 60 %, preferably 10 – 40 %

The catalyst may contain minute amounts of elements other than molybdenum, antimony, bismuth and the group II metal such, for example, as sodium, potassium, sulfur, phosphorus and arsenic, which get into the catalyst during its preparation.

The catalyst prepared in accordance with this invention exhibits excellent properties as an oxidation catalyst particularly for preparing unsaturated aldehydes, unsaturated nitriles, conjugated diolefins or the like from olefins, for instance, monoolefins having three to five carbon atoms. Further the catalyst is suitably used for preparing acrolein or methacrolein from propylene or isobutylene by means of molecular oxygen in the vapor phase, acrylonitrile or methacrylonitrile from propylene or isobutylene by means of ammoxidation, or preparing 1,3-butadiene from 1-butene, cis-2-butene or trans-2-butene by means of molecular oxygen in the vapor phase, 1,3-pentadiene from trans-2-pentene, or isoprene from 3-methyl-2-butene or 3-methyl-1-butene by means of the same vapor phase oxidation. Reaction conditions for preparing these compounds differ somewhat depending on the kinds of the starting olefin and resulting product. However, the reaction is generally conducted under atmospheric pressure, though it is possible to conduct the reaction under superatmospheric or reduced pressure. The reaction temperature is generally 300° – 550°C., preferably 300° – 500°C. It is desired that the amount of oxygen is in the range of from 0.2 to 3.0 moles per mole of the olefin, especially 0.3 to 2.5 moles per mole of the olefin. In the case of the ammoxidation, it is preferred that the amount of ammonia is in the range of from 0.4 to 2.0 moles, especially from 0.5 to 1.5 moles, per mole of the olefin. In conducting the reaction, it is possible to use as a diluent gas a gas substantially inert to the reaction such as steam, nitrogen and carbon dioxide. Steam particularly contributes to an improvement of the selectivity. Accordingly, it is preferable to use steam in an amount of at least 0.5 mole per mole of the olefin.

The size and configuration of catalyst particles are not critical in this invention. It is possible to mold the catalyst into optional forms of optional sizes according to need, for instance, into pellets or granules, and impart a certain strength to the catalyst after sieving.

In the case of the invention catalyst the difference in molding methods does not cause any difference in the catalytic activity of the resulting catalyst. Again, this catalyst can be used in any of the catalytic processes of fluidized, moving or fixed bed, but for prolonging its catalytic activity it is usually advantageously used in a fixed bed.

The process of this invention for preparing catalysts and the excellent effects attained by using the catalysts prepared in accordance with this invention for the oxidation of olefins will now be illustrated by the following Examples. Comparative Examples illustrating embodiments where catalysts prepared by methods other than the process of this invention are also given.

In the Examples and Comparative Examples, the conversion (%) and the selectivity (%) are determined by the following formulas:
Conversion (%) = moles of olefin consumed/moles of olefin fed × 100
Selectivity (%) = moles of product/moles of olefin consumed × 100

EXAMPLE 1

This example illustrates the preparation of the catalyst of the present invention as well as the use of the so prepared catalyst in the ammoxidation of propylene.

An 88-liter vessel was charged with 18.70 kg of calcium nitrate [$Ca(NO_3)_2 \cdot 4H_2O$], after which 15 liters of water were added thereto with thorough stirring to effect the dissolution of the former in the latter. 1.99 kg of antimonous oxide ($Sb_2O_3$) was then added to this solution and dispersed and suspended therein with stirring. This was followed by adding concurrently dropwise to the so obtained suspension 12.4 liters of a 0.307 mol/liter ammonium molybdate solution obtained by dissolving 4.68 kg of ammonium molybdate [$(NH_4)_6Mo_7O_{24} \cdot 4H_2O$] in aqueous ammonia of 9.32 % concentration, and 9.9 liter of a 1.34 mol/liter bismuth nitrate solution obtained by dissolving 6.34 kg of bismuth nitrate [$Bi(NO_3)_3 \cdot 5H_2O$] in nitric acid of 13.8 % concentration. After completion of the dropping, the pH of the combined solution was adjusted to 4 – 4.5 by the prompt addition of a small quantity of aqueous ammonia of 10 % concentration. Stirring was then carried out for an 30 minutes to complete the reaction.

The combined solution was allowed to stand overnight at room temperature after the completion of the reaction to cause the formation of a coprecipitate as well as its ageing.

Next, the supernatant liquid was discarded, and the coprecipitate was transferred to another vessel. The coprecipitate was thoroughly washed by repeating the decantation operation thrice with 360 liters of water so apportioned. The coprecipirate was then separated by filtration using a conventional filter. The foregoing operations were carried out at room temperature (about 20°C.). In addition, the contents of $NH_4NO_3$ and $Ca(NO_3)_2$ left in the precipitate were 0.15 % and 0.08 %, respectively, by weight on the dry basis.

The so obtained coprecipitate was then dried for 16 hours at 120° – 130°C. followed by comminution. After adding a small quantity of graphite (about 1 % by weight based on the dried coprecipitate), the dried precipitate was molded into cylindrical shape (about 5 mm in diameter and 5 mm in length) with a tabletting machine.

The molded tablets were then calcined for 16 hours at 540°C. while passing air through the furnace. As a result, a catalyst was obtained whose composition (atomic ratio) of the four metallic components was Mo : Ca : Sb : Bi = 2 : 6 : 1 : 1. The production yield of this catalyst was 76 %.

Next, this catalyst was comminuted and sieved to particle sizes of 14 – 20 mesh (Tyler standard sieve). Using 4 cc of the so obtained catalyst and packing the same in a U-shaped stainless steel reaction tube having an inside diameter of 8 mm, a catalytic reaction was carried out by passing a gas mixture of a propylene : ammonia : air : water molar ratio of 1 : 1 : 8 : 2 through the tube at the rate of 80 cc per minute for a contact time of 3 seconds while maintaining the inside temperature of the tube at 450°C.

As a result, the conversion was 94.5 % and the selectivity for acrylonitrile was 89.5 %.

EXAMPLES 2 – 13

These examples illustrate the preparation of the catalysts whose atomic ratios of the four metallic components have been varied.

The amounts of antimonous oxide ($Sb_2O_3$), ammonium molybdate [$(NH_4)_6Mo_7O_{24} \cdot 4H_2O$], bismuth nitrate [$Bi(NO_3)_3 \cdot 5H_2O$] and calcium nitrate [$Ca(NO_3)_2 \cdot 4H_2O$] as used in Example 1 were varied, and catalysts with the composition (atomic ratios) of four metallic components indicated in Table 1 were prepared as in Example 1.

The several catalysts were used in an amount of 4 cc and the ammoxidation of propylene was carried out with the same reaction conditions as indicated in Example 1, with the results shown in Table 1.

TABLE 1

| Example | Atomic Ratio of the Four Metallic Components | | | | Conversion of Propylene (%) | Selectivity for Acrylonitrile (%) | Production Yield of Catalyst (%) |
| --- | --- | --- | --- | --- | --- | --- | --- |
| | Mo | Ca | Sb | Bi | | | |
| 2 | 1 | 1 | 1 | 1 | 90.3 | 85.3 | 98.3 |
| 3 | 2 | 2 | 1 | 1 | 95.3 | 87.3 | 99.1 |
| 4 | 2.5 | 2.5 | 1 | 1 | 94.8 | 88.1 | 97.3 |
| 5 | 3 | 3 | 1 | 1 | 90.5 | 85.6 | 95.9 |
| 6 | 4 | 4 | 1 | 1 | 84.2 | 90.3 | 94.5 |
| 7 | 1 | 1 | 2 | 2 | 82.3 | 85.6 | 98.5 |
| 8 | 1 | 1 | 3 | 3 | 80.3 | 86.3 | 98.6 |
| 9 | 4 | 3 | 1 | 1 | 88.3 | 86.3 | 94.3 |
| 10 | 3 | 2 | 1 | 1 | 93.2 | 85.1 | 94.3 |
| 11 | 3 | 5 | 1 | 1 | 91.3 | 87.3 | 83.6 |
| 12 | 2 | 3 | 1 | 1 | 94.9 | 90.3 | 90.2 |
| 13 | 2 | 4 | 1 | 1 | 94.4 | 91.0 | 85.7 |

The following Comparative Examples 1 – 3 are given by way of comparison and illustrate the instances of the preparation of the catalyst by methods not in accordance with the coprecipitation method of the present invention and the use of the so prepared catalysts in the ammoxidation of propylene.

COMPARATIVE EXAMPLE 1

37.9 Grams of ammonium molbdate [$(NH_4)_6Mo_7O_{24} \cdot 4H_2O$] and 12.25 grams of antimonous chloride ($SbCl_3$) were mixed with 31.2 ml of water in an evaporating dish with thorough stirring. Then the mixture was gradually heated to form a paste. Then 13.1 ml of 28 % aqueous ammonia were added to the paste while sitrring and the mixture was heated and evaporated to dryness. The heating was further continued to volatilize and release ammonium chloride. Then the mixture was allowed to stand and cool. Then a solution of 128.5 grams of bismuth nitrate [$Bi(NO_3)_3 \cdot 5H_2O$] and 62.5 grams calcium nitrate [$Ca(NO_3)_2 \cdot 4H_2O$] in 60 % nitric acid and 100 ml of water was added to the above mixture, and the resulting mixture was heated to dryness while stirring, followed by further heating until the generation of a brown gas of nitrogen perioxide ceased. The resulting product was allowed to stand and cool, and 30 ml of water was added thereto to form a paste, which was then gradually heated and dried. The dried product was ground and sieved to particle sizes of 14 – 20 mesh (Tyler standard sieve), and calcined at 540°C. for 16 hours to form a catalyst. The composition of molybdenum, bismuth, antimony and calcium in the resulting catalyst, expressed in terms of the atomic ratio in percent of the four components, was Mo : 26.8 %, Bi : 33.3 %, Sb : 6.6 %, and Ca : 33.3 %.

The ammoxidation of propylene was carried out under the same conditions as in Example 1 with use of 4 cc of the so prepared catalyst.

As a result, acrylonitrile was obtained at a selectivity of 89.9 % with a propylene conversion of 39.3 %. It is seen that the conversion of propylene was exceedingly low.

COMPARATIVE EXAMPLE 2

A 2-liter vessel was charged with 232 grams of antimonous chloride ($SbCl_3$), which was dissolved by adding 24 ml of concentrated hydrochloric acid. Water was then added to effect hydrolysis and formation of a precipitate. Then conversion to an oxide of antimony was carried out by adding 76.7 ml of aqueous ammonia of 28 % concentration, after which the oxide of antimony was then filtered and waterwashed.

The so obtained oxide of antimony was placed in an evaporating dish, and, after adding a solution in 92 ml of nitric acid of 62 % concentration and 92 ml of water, of 492 grams of bismuth nitrate [$Bi(NO_3)_3 \cdot 5H_2O$], the solution was evaporated to dryness until the generation of nitrogen peroxide gas ceased.

The resulting solid product was packed in a U-shaped stainless steel pipe and calcined for 16 hours at 700°C. by heating from the outside while passing air therethrough in the meantime. As a result, bismuth antimonate was obtained having an atomic ratio of Sb to Bi of 1 : 1.

Separately, a 2-liter vessel was charged with a solution in 1,180 ml of water of 177 grams of ammonium molybdate [$(NH_4)_6Mo_7O_{24} \cdot 4H_2O$] followed by addition thereto of a solution in 240 ml of water of 236 grams of calcium nitrate [$Ca(NO_3)_2 \cdot 4H_2O$]. The combined solution was then evaporated to dryness until the generation of nitrogen peroxide ceased.

The so obtained solid product was packed in a U-shaped stainless steel tube and calcined for 16 hours at 540°C. by heating from the outside while passing air therethrough. As a result, calcium molybdate in which the atomic ratio of Mo to Ca was 1 : 1 was obtained.

The so obtained bismuth antimonate ($BiSbO_4$) and calcium molybdate ($CaMoO_4$) were mixed in a weight ratio of 50 : 50 and kneaded with water using a pulverizer. The resulting paste was then dried for 16 hours at 120°C. followed by sieving to particle sizes of 14 – 20 mesh (Tyler standard sieve).

Four cc of the catalyst prepared by the process described hereinabove were packed in a stainless steel U-shaped reaction tube of 8-mm inside diameter, and the ammoxidation of propylene was carried out at a temperature of 470°C. by passing a gas mixture of a propylene : ammonia : steam : air molar ratio of 1 : 1 : 2 : 7.5 through the tube at the rate of 80.5 cc per minute for a contact time of 5.97 seconds.

As a result, the conversion of propylene was 41.2 % and the selectivity for acrylonitrile was 80.5 %.

COMPARATIVE EXAMPLE 3

To 22.4 grams of calcium oxide (CaO), 57.6 grams of molybdenum trioxide ($MoO_3$), 46.5 grams of bismuth oxide ($Bi_2O_3$) and 29.2 grams of antimonous oxide ($Sb_2O_3$) a small amount of water was added, following which the mixture was kneaded for 2 hours with a pulverizer and rendered into a pasty form. This was then dried for 16 hours at 120°C. followed by calcining for 16 hours at 550°C., to thereby obtain the catalyst. The so obtained catalyst was then comminuted and sieved to particle sizes of 14 – 20 mesh (Tyler standard sieve). The composition (atomic ratio) of the four metallic components of this catalyst was Mo : Ca : Sb : Bi = 2 : 2 : 1 : 1.

Four cc of the so obtained catalyst were used, and the ammoxidation of propylene was carried out under conditions identical to Example 1. As a result, the conversion of propylene was 34.5 % and the selectivity for acrylonitrile was 65.4 %.

The following Examples 14 – 23 illustrate the preparation of the invention catalyst as well as the use of the so prepared catalyst in the ammoxidation of propylene.

EXAMPLE 14

A 1-liter vessel was charged with 18.6 grams of calcium hydroxide [$Ca(OH)_2$] and 18.3 grams of antimonous oxide ($Sb_2O_3$), after which 200 ml of water were added and these compounds were dispersed and suspended therein with stirring. To the so obtained suspension 94 ml of a bismuth nitrate solution obtained by dissolving 61.1 grams of bismuth nitrate [$Bi(NO_3)_3 \cdot 5H_2O$] in nitric acid of 13.8 % concentration, and 118 ml of an ammonium molybdate solution obtained by dissolving 44.5 grams of ammonium molybdate [$(NH_4)_6Mo_7O_{24} \cdot 4H_2O$] in aqueous ammonia of 9.32 % concentration were added dropwise concurrently during a 15-minute period.

Next, after adjusting the pH of the combined solution to 4 – 5 by the dropwise addition of a small quantity of aqueous ammonia of a concentration of 9.32 % to the solution, it was allowed to stand for 30 minutes with stirring.

This was followed by allowing the combined solution to stand overnight to form a coprecipitate as well as to age the so formed precipitate. The supernatant liquid was then discarded, and the coprecipitate was washed by repeating the decantation operation thrice, with 5 liters of water so apportioned. This operation was carried out at room temperature (about 20°C.).

The coprecipitate was dried at 120° – 130°C. and then calcined for 16 hours at 550°C. while passing air through the furnace. Thus, a catalyst was prepared whose composition (atomic ratio) of the four metallic components was Mo : Ca : Sb : Bi = 2 : 2 : 1 : 1. The production yield of this catalyst was 98.0 %.

Next, this catalyst was comminuted and sieved to particle sizes of 14 – 20 mesh (Tyler standard sieve).

Four cc of the so obtained catalyst were used, and the ammoxidation of propylene was carried out under the same conditions as in Example 1, with the result that the conversion of propylene was 92.9 % and the selectivity for acrylonitrile was 88.8 %.

EXAMPLE 15

A solution in 200 ml water of 59.4 grams of calcium nitrate [$Ca(NO_3)_2 \cdot 4H_2O$] was charged to a 1-liter vessel, after which 20.3 grams of antimonic oxide ($Sb_2O_5$) were added thereto and dispersed and suspended therein. To the resulting suspension 94 ml of a bismuth nitrate solution of 61.1 grams of bismuth nitrate [$Bi(NO_3)_3 \cdot 5H_2O$] in nitric acid of 13.8 % concentration and 118 ml of an ammonium molybdate solution of 44.5 grams of ammonium molybdate in aqueous ammonia of 9.32 % concentration were then added dropwise and concurrently during a 15-minute period. Next, the pH of the combined solution was adjusted to 4 – 5 by the addition of aqueous ammonia of 9.32 % concentration, following which the solution was allowed to stand for 30 minutes with stirring.

This was followed by allowing the combined solution to stand overnight to cause the formation of a coprecipitate as well as ageing of the coprecipitate. After discarding the supernatant liquid, the coprecipitate was washed by repeating the decantation operation thrice with 5 liters of water so apportioned, after which the coprecipitate was separated by filtration. The foregoing operation was carried out at room temperature (about 20°C.).

The so obtained coprecipitate was then dried at 120° – 130°C., and thereafter calcined for 16 hours at 550°C. As a result, a catalyst whose composition (atomic ratio) of the four metallic components was Mo : Ca : Sb : Bi = 2 : 2 : 1 : 1 was obtained. The production yield of this catalyst was 99.0 %.

Next, this catalyst was comminuted and sieved to particle sizes of 14 – 20 mesh (Tyler standard sieve).

Using 4 cc of the so obtained catalyst, the ammoxidation of propylene was carried out under reaction conditions identical to those of Example 1.

As a result, the conversion of propylene was 93.1 % and the selectivity for acrylonitrile was 90.1 %.

EXAMPLE 16

An 88-liter vessel was charged with 2.970 kg of calcium nitrate [$Ca(NO_3)_2 \cdot 4H_2O$] and by adding 30 liters of water was dissolved therein with thorough stirring. 0.915 kg of antimonous oxide ($Sb_2O_3$) was then added to the foregoing solution and dispersed and suspended therein.

To the so obtained suspension 7.8 liters of 0.221 mol/liter ammonium molybdate solution obtained by dissolving 2.225 kg of ammonium molybdate [$(NH_4)_6Mo_7O_{24} \cdot 4H_2O$] in aqueous ammonia of 9.32 % concentration, and 3.9 liters of a 1.62 mol/liter bismuth nitrate solution obtained by dissolving 1.320 kg of metallic bismuth in 2.5 liters of nitric acid of 60 % concentration and 1.4 liters of water were then concurrently added dropwise. After completion of the dropping, the pH of the combined solution was promptly adjusted to 3.5 – 4 by the addition of a small quantity of aqueous ammonia of 9.32 % concentration, after which the solution was allowed to stand for 30 minutes with stirring.

This was followed by allowing the combined solution to stand overnight to cause the formation of a coprecipitate as well as the ageing of the resulting coprecipitate, followed by discarding the supernatant liquid. The coprecipitate was then transferred to another vessel where the washing of the coprecipitate was thoroughly carried out by repeating the decantation operation four times with 180 liters of water so apportioned. The washed coprecipitate was then separated by filtration. The foregoing operation was carried out at room temperature (about 20°C.).

The so obtained coprecipitate, after drying for 16 hours at 120° – 130°C., was comminuted, incorporated with a small quantity of graphite (about one weight % based on the dried coprecipitate), and molded into cylindrical shape (about 5 mm in diameter and 5 mm long) with a tabletting machine.

The molded tablets were then calcined for 16 hours at 540°C. while passing air through the furnace. Thus was obtain a catalyst whose composition (atomic ratio) of the four metallic components was Mo : Ca : Sb : Bi = 2 : 2 : 1 : 1. The production yield of this catalyst was 98.3 %.

The catalyst was comminuted and sieved to particle sizes of 14 – 20 mesh (Tyler standard sieve). When 4 cc of the so obtained catalyst were used and the ammoxidation of propylene was carried out under identical conditions as in Example 1, the conversion of propylene was 90.3 % and the selectivity for acrylonitrile was 89.1 %.

EXAMPLE 17

After dissolving 116 grams of antimonous chloride ($SbCl_3$) in 12 ml of concentrated hydrochloric acid, hydrolysis was effected by the addition of water and a precipitate was formed. This was converted further to an oxide of antimony by the addition of 76.7 ml of aqueous ammonia, which oxide of antimony was separated by filtration and water-washed. Next, this oxide of antimony was placed in an evaporating dish and, after adding thereto a solution of 246 grams of bismuth nitrate [$Bi(NO_3)_3 \cdot 5H_2O$] in 46 ml of nitric acid of 60 % concentration, the contents of the evaporating dish were heated and evaporated to dryness, thereby obtaining a solid product. By calcining this solid product for 16 hours at 700°C. bismuth antimonate consisting predominantly of BiSbO$_4$ was obtained.

Forty grams of the bismuth antimonate obtained in this manner were added to a 1-liter vessel along with 100 ml of water and dispersed and suspended therein. To this suspension 141 ml of a solution in 9.32 % aqueous ammonia of 54.3 grams of ammonium molybdate [(NH$_4$)$_6$Mo$_7$O$_{24}$·4H$_2$O] and 150 ml of a solution in water of 70.7 grams of calcium nitrate [Ca(NO$_3$)$_2$·4H$_2$O] were concurrently added dropwise from separate vessels during a 15-minute period with stirring. The pH was constantly maintained at 4 – 5 during the dropping operation. Stirring was continued for a further 30 minutes after completion of the dropping. This was followed by repeating the decantation thrice with 500 ml of water so apportioned, then separation of the coprecipitate by filtration, further washing in water and thereafter drying for 12 hours at a temperature of 120°C. to obtain a solid product. This solid product was comminuted and sieved to particle sizes of 14 – 20 mesh (Tyler standard sieve). Next, the so obtained product was calcined for 16 hours at 540°C. while passing air through the furnace. As a result, a catalyst was obtained.

The composition (atomic ratio) of the four metallic components of this catalyst was Mo : Ca : Sb : Bi = 2 : 2 : 1 : 1, and the production yield of the catalyst was 96.3 %.

When 4 cc of this catalyst were used and the ammoxidation of propylene was carried out under identical conditions as in Example 1, the conversion of propylene was 89.9 % and the selectivity for acrylonitrile was 88.9 %.

EXAMPLE 18

An 88-liter vessel was charged with 6.43 kg of bismuth nitrate [Bi(NO$_3$)$_3$·5H$_2$O], after which nitric acid of 13.8 % concentration was added to dissolve the former and obtain a bismuth nitrate solution in an amount of 9.9 liters. 1.99 kg of antimonous oxide (Sb$_2$O$_3$) was added to this solution and dispersed and suspended therein. This was followed by concurrently adding dropwise to this suspension 12.4 liters of a 0.307 mol/liter ammonium molybdate solution obtained by dissolving 4.68 kg of ammonium molybdate [(NH$_4$)$_6$Mo$_7$O$_{24}$·4H$_2$O] in aqueous ammonia of 9.32 % concentration, and 20 liters of a 3.97 mol/liter aqueous calcium nitrate solution obtained by dissolving 18.70 kg of calcium nitrate [Ca(NO$_3$)$_2$·4H$_2$O] in water. After completion of the dropping, the pH of the combined solution was promptly adjusted to 4 – 4.5 with aqueous ammonia of 9.32 % concentration, and stirring was continued for a further 30 minutes to conclude the reaction. The solution was then allowed to stand overnight to cause the formation of a coprecipitate as well as ageing of the coprecipitate. After discarding the supernatant liquid, the coprecipitate was transferred to another vessel where it was thoroughly washed by repeating the decantation operation thrice with 300 liters of water so apportioned. The washed coprecipitate was then separated by filtration. The foregoing operation was carried out at room temperature (about 20°C.).

The so obtained coprecipitate was dried for 16 hours at 120°– 130°C., following which it was comminuted, incorporated with a small quantity of graphite (about one weight % based on the dried coprecipitate) and molded into cylindrical shape (about 5 mm in diameter and 5 mm long) with a tabletting machine.

The molded tablets were then calcined for 16 hours at 540°C. while passing air through the furnace. As a result, a catalyst whose composition (atomic ratio) of the four metallic components was Mo : Ca : Sb : Bi = 2 : 6 : 1 : 1 was obtained. The production yield of this catalyst was 77.9 %.

The so obtained catalyst was next comminuted and sieved to particle sizes of 14 – 20 mesh (Tyler standard sieve). When the ammoxidation of propylene was then carried out under identical conditions as in Example 1 using 4 cc of this catalyst, the conversion of propylene was 93.8 % and the selectivity for acrylonitrile was 88.3 %.

EXAMPLE 19

An 88-liter vessel was charged with 6.23 kg of calcium nitrate [Ca(NO$_3$)$_2$·4H$_2$O], after which 10 liters of water were added and the calcium nitrate was dissolved therein with stirring.

1.99 kg of antimonous oxide (Sb$_2$O$_3$) was added to this solution and dispersed and suspended therein. Next, to the suspension 12.4 liters of a 0.307 mol/liter ammonium molybdate solution obtained by dissolving 4.68 kg of ammonium molybdate [(NH$_4$)$_6$Mo$_7$O$_{24}$·4H$_2$O] in aqueous ammonia of 9.32 % concentration, and 9.9 liters of a 1.34 mol/liter bismuth nitrate solution obtained by dissolving 6.43 kg of bismuth nitrate [Bi(NO$_3$)$_3$·5H$_2$O] in nitric acid of 13.8 % concentration were concurrently added dropwise with stirring. After completion of the dropping, the pH of the combined solution was promptly adjusted to 6.5 – 7.0 with aqueous ammonia of 9.32 % concentration, following which the stirring was continued for a further 30 minutes to complete the reaction. This was followed by allowing the solution to stand overnight to cause the formation of a coprecipitate as well as ageing of the coprecipitate, after which the supernatant liquid was discarded. The coprecipitate was then transferred to another vessel where it was thoroughly washed by repeating the decantation thrice with 300 liters of water so apportioned, followed by separation of the coprecipitate by filtration. The foregoing operation was carried out at room temperature (about 20°C.).

The so obtained coprecipitate was then dried for 16 hours at 120° – 130°C., after which is was comminuted and, after being incorporated with a small quantity of graphte (about one weight % based on the dried coprecipitate), molded into cylindrical solids (about 5 mm in diameter and 5 mm long) with a tabletting machine.

These tablets were then calcined for 16 hours at 540°C. while passing air through the furnace. As a result a catalyst whose composition (atomic ratio) was Mo : Ca : Sb : Bi = 2 : 2 : 1 : 1 was obtained. The production yield of the catalyst was 98.2 %.

Next, this catalyst was comminuted and sieved to particle sizes of 14 – 20 mesh (Tyler standard sieve). Using 4 cc of this catalyst, the ammoxidation of propylene was carried out under identical conditions as in Example 1, with the consequence that the conversion of propylene was 92.5% and the selectivity for acrylonitrile was 87.3 %.

EXAMPLE 20

In carrying out the method of preparing the catalyst described in Example 19, the procedure as well as conditions employed were identical to those used in Example 1, except that the temperature of the suspension of antimonous oxide was maintained at 80° – 90°C. The production yield of the catalyst was 95.3 %.

When 4 cc of the so obtained catalyst were used and the ammoxidation of propylene was carried out under reaction conditions identical to those of Example 1, the conversion of propylene was 94.3 % and the selectivity for acrylonitrile was 89.3%.

EXAMPLE 21

A catalyst was prepared as in Example 1 except that the pH was constantly maintained at 7.5 with ammonia water during the dropping of the ammonium molybdate solution and the bismuth nitrate solution. The production yield of the catalyst was 89.3 %. When 4 cc of the so obtained catalyst were used and the ammoxidation of propylene was carried out under reaction conditions identical to those of Example 1, the conversion of propylene was 89.3 % and the selectivity for acrylonitrile was 87.3 %.

Example 22

Example 1 was repeated except the pH was constantly maintained at 2 during the dropping of the ammonium molybdate solution and the bismuth nitrate solution. The production yield of the catalyst was 95.8 % in this case. This catalyst was used in an amount of 4 cc and the ammoxidation of propylene was carried out as in Example 1, with the result that the conversion of propylene was 90.4 % and the selectivity for acrylonitrile was 88.3 %.

EXAMPLE 23

Example 19 was repeated except that the coprecipitate was calcined at 700°C. instead of 540°C. The production yield of the catalyst in this case was 98.2%. When 4 cc of the so obtained catalyst were used and the ammoxidation of propylene was carried as in Example 1, the conversion of propylene was 83.2 % and the selectivity for acrylonitrile was 86.4 %.

COMPARATIVE EXAMPLE 4

This comparative example illustrates the case of the ammoxidation of propylene wherein a catalyst calcined under conditions outside the scope of the present invention is used.

Example 23 was repeated except that a calcination temperature of 850°C. was used instead of 700°C. The production yield of the catalyst was 98.2 % in this case. When 4 cc of the so obtained catalyst were used and the ammoxidation of propylene was carried out as in Example 1, the conversion of propylene was 50.3 % and the selectivity for acrylonitrile was 75.6 %.

The following Examples 24 and 25 illustrate the preparation of a supported catalyst according to the invention and the ammoxidation of propylene using such a catalyst.

EXAMPLE 24

An 88-liter vessel was charged with 10.9 kg of calcium nitrate [$Ca(NO_3)_2 \cdot 4H_2O$], after which 20 liters of water were added and the calcium nitrate was dissolved in the water.

1.99 Kg of antimonous oxide ($Sb_2O_3$) and 2.0 kg of kaolin powder were added to this solution and dispersed and suspended therein. 35 Liters of a 0.307 mol/liter ammonium molybdate solution obtained by dissolving 11.92 kg of ammonium molybdate [$(NH_4)_6Mo_7O_{24} \cdot 4H_2O$] in aqueous ammonia of 9.32 % concentration, and 16.83 liters of a 1.34 mol/liter bismuth nitrate solution obtained by dissolving 10.9 kg of bismuth nitrate [$Bi(NO_3)_3 \cdot 5H_2O$] in nitric acid of 13.8 % concentration were added dropwise concurrently to the foregoing solution with stirring. After completion of the dropping, the pH of the combined solution was promptly adjusted to 4 – 4.5 with aqueous ammonia of 9.32 % concentration, and stirring was continued for a further 30 minutes to complete the reaction. The reaction solution was then allowed to stand overnight to cause the formation of a coprecipitate as well as the ageing of the coprecipitate, after which the supernatant liquid was discarded. The coprecipitate was then transferred to another vessel and thereafter treated as in Example 19. As a result, a catalyst was obtained whose composition (atomic ratio) of the four metallic components was Mo : Ca : Sb : Bi = 3 : 3 : 1 : 1 and whose content of kaolin was 10 % by weight. The production yield of the catalyst was 99.3 %.

The ammoxidation of propylene was carried out under reaction conditions identical to those of Example 1, using 4 cc of the foregoing catalyst. The conversion of propylene was 90.3 % and the selectivity for acrylonitrile was 85.9 %.

EXAMPLE 25

A catalyst was prepared by operating as in Example 24, except that as carrier material ± 2.0 kg of diatomaceous earth were used instead of 2.0 kg of kaolin powder. The production yield of the catalyst in this case was 99.1 %. When 4 cc of this catalyst were used in the ammoxidation of propylene under reaction conditions identical to those of Example 1, the conversion of propylene was 87.3 % and the selectivity for acrylonitrile was 86.9 %.

EXAMPLE 26

This example illustrates the case of the use of the catalyst of the present invention in the ammoxidation of isobutylene.

The catalyst prepared in Example 1 was used for the ammoxidation of isobutylene. Reaction conditions identical to those of Example 1 were used in carrying out the ammoxidation reaction, except that isobutylene was used instead of propylene and a reaction temperature of 430°C. was used. As a result, the conversion of isobutylene was 90.3 % and the selectivity for methacrylonitrile was 90.7 %

The following Examples 27 and 28 illustrate the use of the catalyst of the present invention in the oxidation of propylene and isobutylene, respectively.

EXAMPLE 27

Four cc of the catalyst prepared in Example 1 were packed in a U-shaped stainless steel reaction tube having an inside diameter of 8 mm. The oxidation of propylene was then carried out by passing a gas mixture of a propylene : air : water molar ratio of 1 : 6: 3: through the tube at the rate of 80 cc per minute for a contact time of 3 seconds while maintaining the temperature inside the tube at 450°C. As a result, the conversion of propylene was 83.3 % and the selectivity for acrolein was 80.5 %.

EXAMPLE 28

The oxidation of isobutylene was carried out by following the procedure described in Example 27 except that isobutylene was used instead of propylene in the reaction gas.

As a result, the conversion of isobutylene was 87.6 % and the selectivity for methacrolein was 79.6 %.

EXAMPLES 29 – 33

These examples illustrate the use of the catalyst of the present invention in the dehydrogenative oxidation of monoolefines to diolefins.

The dehydrogenative oxidation reactions of 1-butene, cis-2-butene, 1-pentene, trans-2-pentene and 3-methyl-1-butene were carried out using 4 cc of the catalyst prepared by the method described in Example 1. Except that the compositions of the gas mixture fed were changed to the conditions indicated in Table 2, the oxidation reactions were otherwise carried out under conditions identical to those of Example 1, with the results shown in Table 2.

the foregoing suspension with stirring. After completion of the dropping, the pH of the combined solution was promptly adjusted to 4 – 4.5 with aqueous ammonia of 9.32 % concentration, and stirring was continued for a further 30 minutes to complete the reaction. This was followed by allowing the solution to stand overnight to cause the formation of a coprecipitate as well as its ageing, after which the supernatant liquid was discarded. The coprecipitate was then thoroughly washed by repeating the decantation operation five times with 5 liters of water so apportioned, following which the coprecipitate was separated by filtration. The foregoing operation was carried out at room temperature (about 20°C.).

After drying the so obtained coprecipitate for 16 hours at 120° – 130°C., it was calcined for 16 hours at 550°C. As a result, a catalyst whose composition (atomic ratio) of the four metallic components was Mo : Ba : Sb : Bi = 2 : 2 : 1 : 1 was obtained. The production yield of this catalyst was 99.3 %.

This catalyst was comminuted and sieved to particle

TABLE 2

| Example | Class of Starting Olefin | Molar Ratio of Gas Mixture Fed | | | | Olefin Conversion (%) | Reaction Product | |
|---|---|---|---|---|---|---|---|---|
| | | Olefin | Steam | Oxygen | Nitrogen | | Conjugated Diolefin | Selectivity (%) |
| 29 | 1-butene | 1 | 1 | 0.6 | 4.4 | 95.6 | 1,3-butadiene | 84.3 |
| 30 | cis-2-butene | 1 | 1 | 0.6 | 4.4 | 93.2 | do. | 83.6 |
| 31 | 1-pentene | 1 | 1 | 0.6 | 9.4 | 80.3 | 1,3-pentadiene | 80.4 |
| 32 | trans-2-pentene | 1 | 1 | 0.6 | 9.4 | 83.1 | do. | 79.5 |
| 33 | 3-methyl-1-butene | 1 | 1 | 0.6 | 9.4 | 79.3 | isoprene | 80.1 |

The following Examples 34 – 42 illustrate the preparation of the invention catalyst which uses a barium salt as the group II metallic component as well as the use of the so prepared catalyst in the ammoxidation and oxidation of propylene and the oxidative dehydrogenation of 1-butene.

EXAMPLE 34

52.75 Grams of barium nitrate [Ba(NO$_3$)$_2$] were placed in a 2-liter vessel and dissolved by adding one liter of water with stirring. 14.63 Grams of antimonous oxide (Sb$_2$O$_3$) were added to this solution and dispersed and suspended therein with stirring. Next, 75.5 ml of a 1.34 mol/liter bismuth nitrate solution obtained by dissolving 49 grams of bismuth nitrate [Bi(NO$_3$)$_3$·5H$_2$O] in nitric acid of 13.8 % concentration and 94.2 ml of an ammonium molybdate solution obtained by dissolving 35.6 grams of ammonium molybdate [(NH$_4$)$_6$Mo$_7$O$_{24}$·4H$_2$O] in aqueous ammonia of 9.32 % concentration were added dropwise concurrently to sizes of 14 – 20 mesh (Tyler standard sieve). When 4 cc of the so obtained catalyst were used and the ammoxidation of propylene was carried out, the conversion of propylene was 85.3 % and the selectivity for acrylonitrile was 87.5 %.

EXAMPLES 35 – 38

Example 34 was repeated in preparing the catalysts, except that the amounts of antimonous oxide (Sb$_2$O$_3$), bismuth nitrate [Bi(NO$_3$)$_3$·5H$_2$O], ammonium molybdate [(NH$_4$)$_6$Mo$_7$O$_{24}$·4H$_2$O] and barium nitrate [Ba(NO$_3$)$_2$] used were varied so that the composition (atomic ratio) of the four metallic components would be as indicated in Table 3.

The so obtained catalysts were each used in an amount of 4 cc and the ammoxidation of propylene was carried under conditions identical to those of Example 1, with the results shown in Table 3.

Table 3

| Example | Atomic Ratio of the Four Metallic Components | | | | Propylene Conversion (%) | Selectivity for Acrylonitrile (%) | Production Yield of Catalyst (%) |
|---|---|---|---|---|---|---|---|
| | Ba | Mo | Sb | Bi | | | |
| 35 | 1 | 1 | 1 | 1 | 87.2 | 90.2 | 98.8 |
| 36 | 3 | 3 | 1 | 1 | 83.4 | 85.3 | 97.6 |
| 37 | 6 | 2 | 1 | 1 | 84.6 | 87.2 | 74.3 |
| 38 | 1 | 1 | 1 | 1 | 82.1 | 85.3 | 99.0 |

EXAMPLE 39

A catalyst was prepared by the same procedure and conditions as in Example 34, except that the pH was constantly maintained at 7 during the time the ammonium molybdate solution and bismuth nitrate solution were added dropwise to the suspension. The production yield of the catalyst in this case was 94.9 %

When the ammoxidation of propylene was carried out as in Example 1 with 4 cc of this catalyst, the conversion of propylene was 83.3 % and the selectivity for acrylonitrile was 89.6 %.

EXAMPLE 40

A catalyst was prepared as in Example 34, except that a calcination temperature of 650°C. was used instead of 550°C. The production yield of the catalyst was 99.3 %.

When 4 cc of this catalyst were used for the ammoxidation of propylene under conditions identical to those of Example 1, the conversion of propylene was 80.3 % and the selectivity for acrylonitrile was 89.5 %.

EXAMPLE 41

Four cc of the catalyst prepared in Example 34 were packed in a U-shaped stainless steel tube of an inside diameter of 8 mm, and the oxidation of propylene was carried out by passing a gas mixture of propylene : air : water molar ratio of 1 : 6 : 3 through the tube maintained at an inside temperature of 450°C. at the rate of 80 cc per minute for a contact time of 3 seconds.

As a result, the conversion of propylene was 87.1 % and the selectivity for acrolein was 80.9 %.

EXAMPLE 42

Except that 1-butene was used instead of propylene and the composition (molar ratio) of the gas mixture was changed to 1-butene : air : water = 1 : 5 : 2, the oxidative dehydrogenation reaction was otherwise carried out as in Example 41 with the same catalyst and reaction conditions.

As a result, the conversion of 1-butene was 96.7 % and the selectivity of 1,3-butadiene was 84.2 %.

The following Examples 43 – 44 illustrate the preparation of the invention catalyst wherein a magnesium salt has been used as the group II metallic component as well as the use of the so prepared catalyst in the ammodidation and oxidation of propylene.

EXAMPLE 43

One hundred three Grams of magnesium nitrate [$Mg(NO_3)_2 \cdot 6H_2O$] were placed in a 1-liter vessel and dissolved by adding 300 ml of water. 19.5 Grams of antimonous oxide ($Sb_2O_3$) were added to this solution with stirring and dispersed and suspended therein. Next, 100 ml of a 1.34 mol/liter bismuth nitrate solution obtained by dissolving 64.9 grams of bismuth nitrate [$Bi(NO_3)_3 \cdot 5H_2O$] in nitric acid of 13.8 % concentration and 187.6 ml pf a 0.311 mol/liter ammonium molybdate solution obtained by dissolving 70.9 grams of ammonium molybdate [$(NH_4)_6Mo_7O_{24} \cdot 4H_2O$] in aqueous ammonia of 9.32 % concentration were added at once to the foregoing suspension, after which the pH of the combined solution was adjusted to 6.5 with nitric acid of 13.8 % concentration and stirred for a further 20 minutes.

This was followed by allowing the combined solution to stand overnight to cause the formation of a coprecipitate as well as its ageing, after which the supernatant liquid was discarded. Then the coprecipitate was transferred to a 2-liter vessel where it was thoroughly washed by repeating the decantation operation seven times with 7 liters of water so apportioned. The washed coprecipitate was then separated by filtration. The foregoing operations were carried out at room temperature (about 20°C.).

The resulting coprecipitate was dried for 16 hours at 120°– 130°C. and thereafter calcined for 16 hours at 550°C. As a result, a catalyst was obtained whose composition (atomic ratio) of the four metallic components was Mo : Mg : Sb : Bi =2 : 2 : 1 : 1. The production yield of the catalyst was 97.3 %.

This catalyst was comminuted and sieved to particle sizes of 14 – 20 mesh (Tyler standard sieve). When 4 cc of the so obtained catalyst were used in the ammoxidation of propylene under reaction conditions identical to those of Example 1, the conversion of propylene was 76.3 % and the selectivity for acrylonitrile was 91.4 %.

EXAMPLE 44

Four cc of the catalyst prepared in Example 43 were packed in a U-shaped stainless steel reaction tube of 8-mm inside diameter, and the oxidation of propylene was carried out by passing a gas mixture of propylene : air : water molar ratio of 1 : 6 : 3 through the tube at the rate of 80 cc per minute for a contact time of 3 seconds while maintaining the inside temperature of the tube at 440°C.

As a result, the conversion of propylene was 75.2 % and the selectivity for acrylonitrile was 81.3 %.

The following Examples 45 and 46 illustrate the preparation of the invention catalyst which uses a zinc salt as the group II metallic components as well as the use of the so obtained catalyst in the ammoxidation and oxidation of propylene.

Example 45

70.3 Grams of zinc nitrate [$Zn(NO_3)_2 \cdot 6H_2O$] were placed in a 1-liter vessel and an aqueous solution thereof was prepared by adding 500 ml of water. 17.2 Grams of antimonous oxide ($Sb_2O_3$) were added to this solution and dispersed and suspended therein. Next, 88.3 ml of a 1.34 mol/liter bismuth nitrate solution obtained by dissolving 57.3 grams of bismuth nitrate [$Bi(NO_3)_3 \cdot 5H_2O$] in nitric acid of 13.2 % concentration and 110 ml of a 0.306 mol/litter ammonium molybdate solution obtained by dissolving 41,6 grams of ammonium molybdate in aqueous ammonia of 9.32 % concentration were added concurrently in a simple addition to the foregoing suspension, after which the pH of the combined solution was adjusted to 5 with aqueous ammonia of 9.32 % concentration. The solution was then stirred for 30 minutes.

Next, the combined solution was allowed to stand overnight to cause the formation of a coprecipitate as well as its ageing, after which the supernatant liquid was discarded. The coprecipitate was then transferred to a 2-liter vessel and thoroughly washed by repeating the decantation operation five times with 5 liters of water so apportioned. The washed coprecipitate was then separated by filtration. The foregoing operations were carried out at room temperature (about 20°C.).

The so obtained coprecipitate was dried for 16 hours at 120°– 130°C. and thereafter calcined for 16 hours at 550°C. Thus, a catalyst was obtained whose composition (atomic ratio) of the four metallic components was Mo : Zn : Sb : Bi = 2 : 2 : 1 : 1. The production yield of the catalyst was 98.6 %.

This catalyst was comminuted and sieved to particle sizes of 14 – 20 mesh (Tyler standard sieve). When 4 cc of the so obtained catalyst were used and the ammoxidation of propylene was carried out as in Example 1, the conversion of propylene was 78.5 % and the selectivity for acrylonitrile was 87.9 %.

EXAMPLE 46

The oxidation reaction of propylene was carried out by packing a U-shaped stainless steel reaction tube of 8-mm inside diameter with 4 cc of the catalyst prepared in Example 45 and passing therethrough a gas mixture of a propylene : air : water molar ratio of 1 : 6 : 3 at the rate of 80 cc per minute for a contact time of 3 seconds while maintaining the inside temperature of the tube at 440°C.

As a result, the conversion of propylene was 77.3 % and the selectivity for acrylonitrile was 82.3 %.

The following Examples 47 – 52 illustrate the preparation of the invention catalyst which contains a cadmium salt as the group II metallic component as well as the use of the so obtained catalyst in the ammoxidation and oxidation of propylene and the oxidation of isobutylene.

EXAMPLE 47

73.1 Grams of cadmium nitrate [$Cd(NO_3)_2 \cdot 4H_2O$] were placed in a 1-liter vessel and by adding 500 ml of water were dissolved therein. 17.2 Grams of antimonous oxide ($Sb_2O_3$) were added to this solution and dispersed and suspened therein. Next, 88.3 ml of a 1.34 mol/liter bismuth nitrate solution obtained by dissolving 57.3 grams of bismuth nitrate [$Bi(NO_3)_3 \cdot 5H_2O$] in nitric acid of 13.8 concentration and 110 ml of a 0.306 mol/liter ammonium molybdate solution obtained by dissolving 41.6 grams of ammonium molybdate [$(NH_4)_6Mo_7O_{24} \cdot 4H_2O$] in aqueous ammonia of 9.32 % concentration were added concurrently to the foregoing suspension during a 10-minute period, after which the pH of the combined solution was adjusted to 5 with aqueous ammonia of 9.32 % concentration, and the solution was stirred for 30 minutes.

The combined solution was then allowed to stand overnight to cause the formation of a coprecipitate as well as its ageing, after which the supernatant liquid was discarded. The coprecipitate was then thoroughly washed by repeating decantation operation five times with 5 liters of water so apportioned. This was followed by separation of the coprecipitate by filtration. The foregoing operations were carried out at room temperature (about 20°C.).

The so obtained coprecipitate was dried for 16 hours at 120°– 130°C. followed by calcining for 16 hours at 550°C. As a result, a catalyst was obtained whose composition (atomic ratio) of the four metallic components was Mo : Cd : Sb : Bi = 2 : 2 : 1 : 1. The production yield of this catalyst was 98.9 %.

The so obtained catalyst was then comminuted and sieved to particle sizes of 14 – 20 mesh (Tyler standard sieve). When the ammoxidation of propylene was carried out as in Example 1 using 4 cc of this catalyst, the conversion of propylene was 85.6 % and the selectivity for acrylonitrile was 83.4 %.

EXAMPLES 48 – 50

Example 47 was repeated with the exception that the amounts of the antimonous oxide ($Sb_2O_3$), bismuth nitrate [$Bi(NO_3)_3 \cdot 5H_2O$], ammonium molybdate [$(NH_4)_6Mo_7O_{24} \cdot 4H_2O$] and cadmium nitrate [$Cd(NO_3)_2 \cdot 4H_2O$] used were such that the composition (aromic ratio) of the four metallic components was as indicated in Table 4.

Four cc of the so obtained catalyst were used and the ammoxidation of propylene was carried out as in Example 1, with the results shown in Table 4.

TABLE 4

| Example | Atomic Ratio of the Four Metallic Components | | | | Conversion of Propylene (%) | Selectivity for Acrylonitrile (%) | Production Yield of Catalyst (%) |
|---|---|---|---|---|---|---|---|
| | Cd | Mo | Sb | Bi | | | |
| 48 | 3 | 3 | 1 | 1 | 87.4 | 84.5 | 96.4 |
| 49 | 1 | 1 | 1 | 1 | 83.9 | 82.6 | 95.3 |
| 50 | 1 | 1 | 3 | 3 | 80.6 | 80.6 | 97.6 |

EXAMPLE 51

A U-shaped stainless steel reaction tube of 8-mm inside diameter was packed with 4 cc of the catalyst prepared in Example 47, and the oxidation reaction of propylene was carried out by passing therethrough a gas mixture of a propylene : air : water molar ratio of 1 : 6 : 3 at the rate of 80 cc per minute for a contact time of 3 seconds while maintaining the inside temperature of the tube at 440°C.

As a result, the conversion of propylene was 80.3 % and the selectivity for acrolein was 81.2 %.

Example 52

Example 51 was repeated except that isobutylene was used instead of propylene, with the result that the conversion of isobutylene was 84.3 % and the selectivity for methacrolein was 78.3 %.

EXAMPLE 53

This example illustrates the case where the order of addition of the several components has been changed in preparing the catalyst and the use of a catalyst so obtained in the ammoxidation of propylene.

9.9 Liters of a 1.34 mol/liter bismuth nitrate solution obtained by dissolving 6.43 kg of bismuth nitrate [$Bi(NO_3)_3 \cdot 5H_2O$] in nitric acid of 13.8 % concentration and a solution of 6.23 kg of calcium nitrate [$Ca(NO_3)_2 \cdot 4H_2O$] in 10 liters of water were charged to an 88-liter vessel and mixed with thorough stirring.

1.99Kg of antimonous oxide ($Sb_2O_3$) were added to this solution and dispersed and suspended therein with stirring. Next, 12.4 liters of a 0.307 mol/liter ammonium molybdate solution obtained by dissolving 4.68 kg of ammonium molybdate [$(MH_4)_6 Mo_7O_{24} \cdot 4H_2$] in aqueous ammonia of 9.32 % concentration were added dropwise to the foregoins suspension with stirring. After completion of the dropping, the PH of the combined solution was promptly adjusted to 5 – 6 with aqueous ammonia of 9.32 % concentration. This was followed by allowing the solution to stand overnight to cause the formation of coprecipitate as well as its ageing. Next, after discarding the supernatant liquid, the coprecipitate was transferred to another vessel, where it was thoroughly washed by repeating the decantation operation thrice with 300 ml of water so apportioned. The washed coprecipitate was then separated by filtration. The foregoing operations were carried out at room temperature.

The so obtained coprecipitate was dried for 16 hours at 120°– 130°C. and comminuted. Then after adding a small amount of graphite (about one weight % based on the dried coprecipitate) to the dried and comminuted coprecipitate, it was molded into cylindrical shape (about 5 mm in diameter and 5 mm long) with a tabletting machine.

The molded tablets were then calcined for 16 hours at 540°C. As a result, a catalyst whose composition (atomic ratio) of the four metallic components was Mo : Ca : Sb : Bi = 2 : 2 : 1 : 1 was obtained. The production yield of this catalyst was 98.0 %.

Next, this catalyst was comminuted and sieved to particle sizes of 14 – 20 mesh (Tyler standard sieve). When 4 cc of the so obtained catalyst were used in the ammoxidation of propylene by operating as in Example 1, the conversion of propylene was 93.6 % and the selectivity for acrylonitrile was 86.9 %.

COMPARATIVE EXAMPLE 5

This example illustrates, by way of comparison, the preparation of a catalyst not using the group II metallic component as well as the case where the ammoxidation of propylene was carried out using the so obtained catalyst.

37.9 Grams of ammonium molybdate [$(NH_4)_6Mo_7O_{24} \cdot 4H_2O$], 12.25 grams of antimonous chloride ($SbCl_3$) and 31.2 cc of water were mixed with thorough stirring in an evaporating dish. The mixture was then rendered into a pasty form by slowly heating it, following which 13.1 cc of 28 % acqueous ammonia were added. Heating of the mixture was continued with stirring until it was dried. The heating was continued further until ammonium chloride was sublimed and driven off, after which the mixture was allowed to cool. A solution in 40 cc of water of 128.5 grams of bismuth nitrate [$Bi(NO_3)_3 \cdot 5H_2O$] and 14 cc of 60 % nitric acid was added to the mixture with stirring, followed by again heating the mixture to dryness, the heating being continued until the generation of a brown gas of nitrogen peroxide ceased. The dried mixture was then allowed to cool, after which it was rendered into a pasty form by adding 30 cc of water. This was followed by drying this mixture by heating it mildly, after which the dried product was comminuted, sieved to particle sizes of 10 – 20 mesh (Tyler standard sieve) and calcined for 16 hours at 540°C. As a result, a catalyst whose composition (atmic ratio in percent) of the three components was Mo : 40 %, Bi : 50 % and Sb : 10 % was obtained.

When 4 cc of this catalyst were used and the ammoxidation of propylene was carried out under conditions identical to those of Example 1, the conversion of propylene was 39.3% and the selectivity for acrylonitrile was 89.9 % thus, demonstrating that the conversion of propylene was exceedingly low.

We claim:

1. A process for the preparation of an oxidation catalyst, consisting essentially of molybdenum, bismuth, a group II metal of the periodic table and oxygen, which comprises in combination the steps of forming a combined solution by combining (a) a dispersion in which a member selected from the group consisting of the oxides of antimony and bismuth antimonate has been suspended, (b) a solution of a salt of a group II metal of the periodic table, (c) a solution of a member selected from molybdic acid and salts thereof, and (d) a solution of a bismuth salt; adjusting the pH of said combined solution to a value of 1 – 8 to thereby cause the formation of a coprecipitate containing said four components of molybdenum, antimony, bismuth and group II metal; separating the resulting coprecipitate from the mother liquor; washing the separated coprecipitate; and thereafter calcining the washed coprecipitate at a temperature ranging between 400° and 800°C.

2. The process of claim 1 wherein the member selected from the oxides of antimony and bismuth antimonate, the salt of a group II metal, the member selected from molybdic acid and salts thereof, and the bismuth salt are combined in the following proportions:

Mo : 5 – 60 %
Sb : 5 – 60 %
Bi : 5 – 60 %
Group II metal : 5 – 60 %

3. The process of claim 2 wherein the member selected from the oxides of antimony and bismuth antimonate, the salt of a group II metal, the member selected from molybdic acid and salts thereof, and the bismuth salt are combined in such a proportion that the amounts of antimony and bismuth are substantially equal.

4. The process of claim 1 wherein the dispersion of a member selected from the group consisting of oxides of antimony and bismuth antimonate has a concentration of 1 – 50 % by weight calculated as antimonous oxide, the solution of a group II metal salt has a concentration of 1 – 60 % by weight calculated as an oxide of said metal, the solution of a member selected from the group consisting of molybdic acid and salts thereof has a concentration fo 5 – 50 % by weight calculated as molybdenum trioxide, and the solution of a bismuth salt has a concentration of 3 – 50 % by weight calculated as $Bi_2O_3$.

5. The process of claim 1 wherein the concentration of solids in the combined solution is adjusted to 3 – 40 % by weight in forming the coprecipitate.

6. The proces of claim 1 wherein said coprecipitate is formed by maintaining said combined solution at a PH of 1 – 8 and stirring said combined solution for 10 minutes to 3 hours at a temperature of 10°– 90°C.

7. An oxidation catalyst prepared by the process of claim 1.

* * * * *